United States Patent [19]

Di Diego

[11] 4,286,387
[45] Sep. 1, 1981

[54] COILABLE RULE CASING

[75] Inventor: Robert Di Diego, Torrance, Calif.

[73] Assignee: The Stanley Works, New Britain, Conn.

[21] Appl. No.: 142,451

[22] Filed: Apr. 21, 1980

Related U.S. Application Data

[63] Continuation of Ser. No. 16,925, Mar. 2, 1979, abandoned.

[51] Int. Cl.³ .............................................. G01B 3/10
[52] U.S. Cl. ....................................... 33/138; 221/1; 242/84.8
[58] Field of Search ................. 33/138, 137; 221/1 A; 242/84.8

[56] References Cited

U.S. PATENT DOCUMENTS

| | | | |
|---|---|---|---|
| 1,812,965 | 7/1931 | Langsher | 221/1 A |
| 3,216,117 | 11/1965 | Stowell | 33/138 |
| 3,228,626 | 1/1966 | Quenot | 242/84.8 |
| 3,243,139 | 3/1966 | Quenot | 242/84.8 |
| 3,606,194 | 9/1971 | Quenot | 242/84.8 |

Primary Examiner—William D. Martin, Jr.
Attorney, Agent, or Firm—Prutzman, Kalb, Chilton & Alix

[57] ABSTRACT

A composite casing for a coilable rule comprises a pair of inner, plastic case members and a thin, outer metal case which receives the plastic case members in a close fitting relationship. A center post is received in central openings provided in the plastic case members to support a measuring tape and coil spring of the rule. One end of the center post has an enlarged head and its other end receives an assembly screw extending through holes in the metal case to engage and hold the metal case in firm assembly with the plastic case members. A series of knurls is formed on the center post for engaging one of the plastic case members to hold the post firmly in place. Alternatively, the center post may be formed as an integral part of one of the plastic case members. A plurality of deformable ribs may be provided on the exterior surfaces of the plastic case members to engage the metal case and firmly hold the assembly together.

9 Claims, 5 Drawing Figures

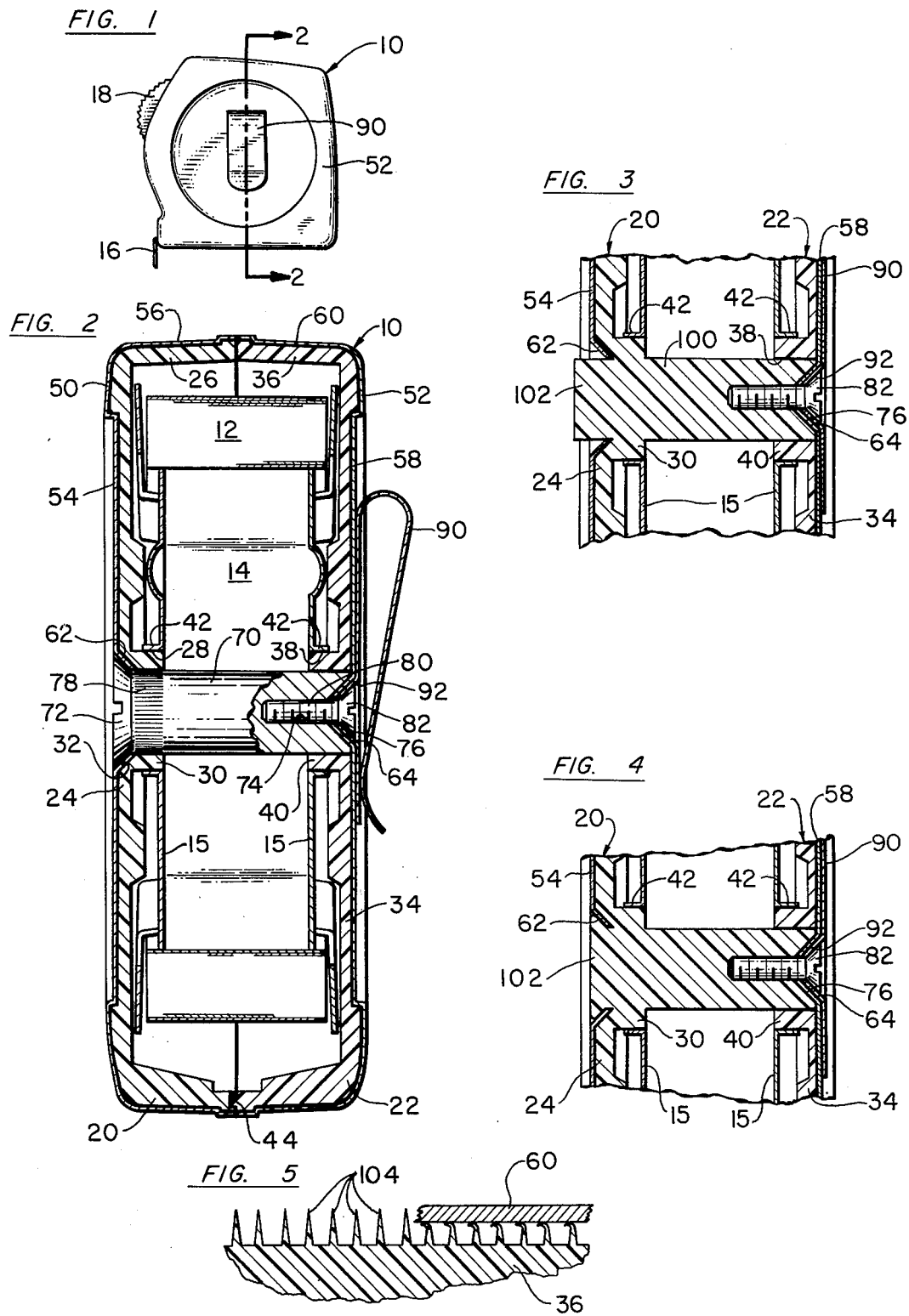

COILABLE RULE CASING

This is a continuation of application Ser. No. 016,925, filed Mar. 2, 1979, now abandoned.

The present invention relates to a casing for a coilable rule and, more particularly, to an improved casing structure including a pair of inner plastic case members received in a thin outer metal case.

U.S. Pat. Nos. 3,214,836 and 3,216,117, assigned to the assignee of the present invention, illustrate coilable rules of the type concerned in this invention. Generally, such rules include a coilable measuring tape and a coil spring contained within a protective metal casing. The casing typically consists of two separate die castings composed entirely of metal to provide a rugged structure which protects the rule against damage. The all-metal casing is relatively expensive to manufacture and results in a relatively heavy rule. In addition, frictional contact with the metal casing results in wear on the movable components of the rule, especially on the surface of the measuring tape at the location where it passes through the casing.

An objective of the present invention is to provide an improved casing for a coilable rule which provides the same rugged structure and protective features of the all-metal casings previously used without the manufacturing expense associated with a solid metal casing. A primary purpose is to provide a composite casing consisting of a pair of inner plastic case members and an outer metal case which has the necessary toughness to withstand abuse and to remain securely assembled throughout the useful life of the casing.

In addition, the invention is intended to provide an improved coilable rule casing which minimizes friction between the casing and movable components of the rule to reduce wear on the measuring tape. It is also intended to provide a coilable rule casing which is lighter in weight and easier to handle than conventional all-metal casings.

The present invention achieves the above objectives in a casing for a coilable rule comprising a pair of inner, plastic case members each having a side wall provided with an inwardly extending, peripheral flange and adapted to fit together to provide a hollow chamber for receiving the measuring tape and coil spring, and a thin, outer metal case shaped to conform to the exterior configuration of the side walls and flanges of the inner plastic case members and adapted to receive the plastic case members in a close fitting relationship. Each plastic case member includes a central opening formed in its side wall. The metal case includes a pair of holes formed in its opposite sides in alignment with the openings in the plastic case members. A center post is received in the central openings in the plastic case members and extends across the hollow chamber for supporting the measuring tape and coil spring. One end of the post extends through one of the holes in the metal case and has an enlarged head for engaging the side of the metal case adjacent to the hole to hold the metal case against the adjacent plastic case member. The post includes a knurled surface for engaging one of the plastic case members in its central opening to hold the post firmly in place. The other end of the post has an inwardly extending axial bore to receive a screw provided with an enlarged headed end for engaging the opposite side of the metal case adjacent to the other hole to hold the metal case against the other plastic case member.

Preferably, a series of knurls are formed on the center post adjacent to its enlarged head. The knurls provide firm engagement between the center post and one of the plastic case members to hold the metal case and plastic case member in a secure assembly. In addition, the knurls prevent rotation of the center post when the screw is threaded into its other end in the assembly of the rule.

In a preferred embodiment of the invention, the outer metal case comprises a pair of mating case portions, each having a side wall and peripheral flange conforming in a close fitting relationship to the side wall and peripheral flange of the corresponding inner plastic case member. Further, in accordance with another feature of the invention, each plastic case member includes a plurality of deformable ribs provided on the exterior surfaces of its side wall and peripheral flange for engaging the interior of the metal case to securely hold the metal case and plastic case members together and to prevent relative movement therebetween.

In an aternative embodiment of the invention, an integral, center post is formed on one of the plastic case members and extends across the hollow chamber into the opening provided in the other plastic case member. The post has an axial bore at its free end. A screw is threadably received in the axial bore and provided with an enlarged headed end for engaging the metal case to hold the metal case and plastic case members together.

The invention achieves a casing for a coilable rule which is rugged in construction and light in weight. It also achieves a composite casing in which the inner plastic case members are held in firm assembly with the outer metal case. The use of plastic case members for the interior of the casing reduces the friction between the casing and movable components of the rule. As a result, the wear on the measuring tape is substantially reduced, particularly at the location where the tape passes through the casing.

The improved casing of this invention substantially duplicates the configuration of the all-metal casing disclosed in U.S. Pat. No. 3,216,117. Thus, with respect to more detailed structural features of the casing, reference should be made to the specification and drawings of U.S. Pat. No. 3,216,117, which is hereby incorporated by reference.

The accompanying drawing illustrates preferred embodiments of the invention and, together with the description serves to explain the principles of the invention.

IN THE DRAWING

FIG. 1 is a side elevation of a coilable rule illustrating the external configuration of a casing constructed in accordance with the present invention;

FIG. 2 is an enlarged vertical section taken along line 2—2 of FIG. 1, showing the details of the inner plastic case members, outer metal case, and central post of a preferred embodiment of the invention;

FIGS. 3 and 4 illustrate an alternative embodiment of the casing; and

FIG. 5 illustrates a plurality of deformable ribs preferably provided on the exterior surfaces of the inner plastic case members to engage and hold the outer metal case.

Referring to FIGS. 1 and 2, a coilable rule embodying the present invention comprises a casing, generally 10, which receives a coilable measuring tape 12 and a coil spring 14 for winding the measuring tape into a coiled position within the casing. The rule also includes a pair of discs 15 (FIG. 2) rotatably mounted on casing 10 at opposite sides of measuring tape 12 and coil spring 14. The pair of discs serves as a guide for measuring tape 12 and coil spring 14 to prevent frictional engagement between the casing and the edges of the measuring tape and coil spring. The structural details of the discs are described in U.S. Pat. No. 3,216,117.

Casing 10 is provided with a mouth (not shown) adjacent to its bottom wall through which measuring tape 12 passes when the tape is extended and retracted. The inner end of measuring tape 12 may be connected to the outer end of coil spring 14 by a tongue and slot connection (not shown) and the opposite end of the measuring tape is provided with a conventional hook 16 (FIG. 1). In addition, a locking mechanism, generally 18, may be provided, as disclosed and claimed in U.S. Pat. No. 3,214,836.

The casing of the present invention includes a pair of inner, plastic case members or inserts 20 and 22 (FIG. 2) adapted to fit together to provide a hollow chamber for receiving measuring tape 12 and coil spring 14. Preferably, each inner plastic case member or insert consists of low-friction, high-impact plastic material, e.g., black ABS plastic. Plastic insert 20 includes a side wall 24 provided with an inwardly extending peripheral flange 26. A central opening 28, preferably circular, is provided in side wall 24 of plastic insert 20. A cylindrical boss 30 extends inwardly from side wall 24 and surrounds circular opening 28. An inwardly tapered surface 32 is provided on the exterior of side wall 24 around opening 28.

Similarly, plastic insert 22 includes a side wall 34 provided with an inwardly extending, peripheral flange 36, a central spring 38, and a cylindrical boss 40 extending inwardly from side wall 34 and surrounding opening 38. As shown in FIG. 2, circular openings 28, 38 and cylindrical bosses 30, 40 are in axial alignment. Each disc 15 includes an annular hub portion 42 which receives the corresponding cylindrical boss 30, 40 of the plastic inserts. Plastic inserts 20 and 22 may be provided with a plurality of male-female connections 44 (one shown) which allow the inserts to fit together in a predetermined orientation to define the hollow chamber in which measuring tape 12 and coil spring 14 are received. Both inserts can be molded by known techniques.

In accordance with the invention, casing 10 also includes a thin, outer metal case or skin shaped to conform to the exterior configuration of the side walls and flanges of the inner, plastic case members or inserts. Preferably, as shown in FIG. 2, the thin outer metal case comprises a pair of mating case portions 50 and 52 which receive plastic inserts 20 and 22 in a close fitting relationship. Metal case portion 50 includes a side wall 54 shaped to conform to the exterior surface of side wall 24 of plastic insert 20 and a peripheral flange 56 shaped to conform to the exterior surface of flange 26 of the plastic insert. Similarly, metal case portion 52 includes a side wall 58 shaped to conform to the exterior surface of side wall 34 of plastic insert 22 and a peripheral flange 60 shaped to conform to the exterior surface of flange 36 of the plastic insert.

Metal case portion 50 includes an inwardly tapered, annular flange 62 which defines a circular hole in its side wall 54 in alignment with circular opening 38 of plastic insert 20. Similarly, metal case portion 52 includes an inwardly tapered, annular flange 64 which defines a circular hole in its side wall 58 in alignment with circular opening 38 of plastic insert 22. As shown in FIG. 2, the hole defined by annular flange 62 is substantially larger than the hole defined by annular flange 64.

Metal case portions 50 and 52 may be formed as a thin steel shell. Preferably, the thin steel is chrome plated to enhance its durability.

A center post 70, preferably metal, is received in central openings 28 and 38 provided in plastic inserts 20 and 22. Post 70 extends across the hollow chamber defined by the plastic inserts to provide a support for measuring tape 12 and coil spring 14. The inner end of coil spring 14 may be anchored to post 70. One end of post 70 extends through the large hole in side wall 54 of metal case portion 50 and has an enlarged head 72 for engaging annular flange 62 to hold the metal side wall against side wall 24 of plastic insert 20. The other end of post 70 has an axial bore 74 which, in the preferred embodiment, is internally threaded. This end is countersunk to provide an inwardly tapered, conical surface 76 for receiving annular flange 64 of metal case portion 52.

In the preferred embodiment, as shown in FIG. 2, center post 70 includes a knurled surface 78 for engaging plastic insert 20 to hold the post firmly in place. Preferably, a series of knurls is formed around the exterior of post 70 adjacent to its enlarged head 72. With post 70 inserted in opening 28, its knurled surface 78 engages plastic insert 20 along the inner cylindrical surface of boss 30 to hold the post firmly in place. The knurls secure post 70 to plastic insert 20 so that side wall 54 of metal case portion 50 is held against side wall 24 of plastic insert 20. The knurls also prevent undesired rotation of post 70 relative to plastic insert 20.

An assembly screw 80 is received in threaded axial bore 74 in center post 70. Assembly screw 80 is provided with an enlarged headed end 82 for engaging flange 64 of metal case portion 52 to hold its side wall 58 against side wall 34 of plastic insert 22.

In a preferred embodiment, a belt clip 90 may be mounted on the metal case. The belt clip comprises a generally flat, metal strip bent into the desired shape and provided with an inwardly tapered, annular flange 92 which defines a circular hole for receiving assembly screw 80. Headed end 82 of the assembly screw serves to fasten belt clip 90 to the metal case.

Referring to FIGS. 3 and 4, in an alternative embodiment of the invention, an integral, center post 100 may be formed on plastic insert 20 in place of the separate post provided in the preferred embodiment of FIG. 2. The free end of post 100, which is received in central opening 38 of plastic insert 22, is identical in configuration to the corresponding end of post 70 (FIG. 2). Accordingly, the same reference numerals are used to identify the structural features of post 100.

Initially, the opposite end of post 100, which is integrally formed as part of insert 20, includes a cylindrical extension 102 which is received in the hole defined by annular flange 62 of side wall 54 of the metal case. As shown in FIG. 4, cylindrical extension 102 may be shaped into an integral retainer by conventional heating or ultrasonic techniques to lock annular flange 62 of the metal case to plastic insert 20.

Preferably, in the alternative embodiment of FIGS. 3 and 4, post 100 may be provided with a hollow bore at its free end and assembly screw 82 may be a self-tapping screw.

In accordance with another aspect of the invention, a plurality of deformable ribs may be provided on the exterior surfaces of the side wall and peripheral flange of each plastic insert for engaging the interior of the metal case to securely hold the metal case and plastic inserts together to prevent relative movement therebetween. As shown in FIG. 5, which is a greatly enlarged view, a plurality of deformable ribs 104 may be provided on peripheral flange 36 of plastic insert 22. When metal case portion 52 is assembled over plastic insert 22, ribs 104 on peripheral flange 36 are deformed as the ribs move into contact with peripheral flange 60 of the metal case. The deformed ribs enhance the frictional engagement between the plastic insert and metal case portion to securely hold these components together. Similar deformable ribs may be provided on all exterior surfaces of plastic inserts 20 and 22.

The present invention is not limited to the specific details shown and described, and modifications may be made to the coilable rule casing without departing from the principles of the invention.

What is claimed is:

1. In a coilable rule having a coilable measuring tape and a coil spring to retract the tape, a casing comprising:
    a pair of inner, plastic case members each having a side wall provided with an inwardly extending, peripheral flange and adapted to fit together to provide a hollow chamber for receiving the measuring tape and coil spring, each inner plastic case member including a central opening in its side wall;
    a thin, outer metal case shaped to conform to the exterior configuration of said side walls and flanges of said inner plastic case members and adapted to receive said plastic case members in a close fitting relationship, said outer metal case including a pair of holes formed in its opposite sides in alignment with said openings in said inner plastic case members;
    a center post received in said central openings in said plastic case members and extending across the hollow chamber for supporting the measuring tape and coil spring, one end of said post extending through one of said holes in said metal case and having an enlarged head for engaging one side of said metal case adjacent to said one hole to hold said metal case against the adjacent plastic case member and its other end having an inwardly extending axial bore, said post including a knurled surface formed thereon for engaging one of said plastic case members in its central opening to hold said post firmly in place; and
    a screw received in said axial bore in said center post and provided with an enlarged headed end for engaging said metal case adjacent to the other hole therein to hold said metal case against the other plastic case member.

2. The coilable rule casing of claim 1, wherein said center post includes:
    a series of knurls formed around said post adjacent to its enlarged head to provide said knurled surface thereon.

3. The coilable rule casing of claim 1, wherein said outer metal case comprises:
    a pair of mating case portions, each having a side wall and peripheral flange conforming in a close fitting relationship to the side wall and peripheral flange of the corresponding plastic case member.

4. The coilable rule casing of claim 1, wherein each plastic case member includes:
    a plurality of deformable ribs provided on the exterior surfaces of its side wall and peripheral flange for engaging the interior of said metal case to securely hold said metal case and plastic case members together to prevent relative movement therebetween.

5. In a measuring device having a coilable measuring tape and a coil spring to retract the tape, a casing comprising:
    first and second molded plastic inserts each having a side wall provided with an inwardly extending peripheral flange and adapted to fit together to provide a hollow chamber for receiving the measuring tape and coil spring, said first plastic insert including a central opening formed in its side wall;
    a thin outer metal case shaped to conform to the exterior configuration of said side walls and flanges of said plastic inserts and adapted to receive said plastic inserts in a close fitting relationship, said metal case including a hole on one side thereof in alignment with said opening in said first plastic insert;
    an integral, center post formed on said second plastic insert and extending across the hollow chamber with a free end received in said central opening in said first plastic insert for supporting the measuring tape and coil spring, said post having an axial bore at its free end; and
    a screw threadably received in said axial bore in said post and provided with an enlarged headed end for engaging said metal case adjacent to said hole therein to hold said metal case and said plastic inserts together.

6. The casing of claim 5, wherein:
    said metal case includes an additional hole formed on the opposite side thereof; and
    said second plastic insert includes an integral retainer extending into said additional hole in said metal case to hold said metal case firmly against said second plastic insert.

7. The casing of claim 5, wherein said outer metal case comprises:
    a pair of mating case portions, each having a side wall and peripheral flange conforming in a close fitting relationship to the side wall and peripheral flange of the corresponding plastic insert.

8. The casing of claim 5, wherein each plastic insert includes:
    a plurality of deformable ribs provided on the exterior surfaces of its side wall and peripheral flange for engaging the interior of said metal case to securely hold said metal case and plastic inserts together to prevent relative movement therebetween.

9. In a measuring device having a coilable measuring tape and a coil spring to retract the tape, a casing comprising:
    first and second molded plastic inserts each having a side wall provided with an inwardly extending peripheral flange and adapted to fit together to provide a hollow chamber for receiving the measuring tape and coil spring, said first plastic insert including a central opening formed in its side wall;
    a thin outer metal case comprising a pair of case members shaped to conform to the exterior configuration of said side walls and flanges of said plastic inserts and adapted respectively to receive said plastic inserts in a close fitting nesting relationship, said metal case including a hole on one side thereof in alignment with said opening in said first plastic insert;

a center post extending across the hollow chamber with a free end in alignment with said central opening in said first plastic insert for supporting the measuring tape and coil spring, said post being secured to said second plastic insert and one of said outer case members; and fastening means securing said first plastic insert and the other of said outer case members to the free end of said post to hold said metal case and said plastic inserts together.

* * * * *